Patented June 20, 1944

2,351,912

UNITED STATES PATENT OFFICE 2,351,912

EMULSION

Joseph N. Borglin, Wilmington, Del., assignor to Hercules Powder Company, Wilmington, Del., a corporation of Delaware No Drawing. Application March 26, 1941, Serial No. 385,313

13 Claims. (Cl. 252—311.5)

This invention relates to emulsions and more particularly to emulsions of the oil-in-water type.

Emulsions such as bituminous and asphaltic emulsions or natural or synthetic resin emulsions and the like have heretofore been prepared by various methods using various emulsifying agents. However, the prior art practices have been subject to numerous objections such as difficulty of preparation of the emulsions, instability of the resulting emulsion, difficulty of obtaining an emulsion of the desired viscosity, deterioration of the emulsion upon the passage of time especially where a putrefiable organic thickening medium is used such as gelatine, glue, casein, blood, etc.

It is an object of the present invention to provide an improved emulsion overcoming to a large extent the difficulties with emulsions heretofore available.

Another object is to provide an improved process for the production of emulsions.

A still further object is to provide an improved bituminous emulsion of the oil-in-water type.

Another object is to produce an emulsion of higher viscosity than emulsions heretofore provided and an emulsion in which the viscosity is subject to control at will.

Still other objects will more fully hereinafter appear.

In accordance with the present invention, the foregoing objects are accomplished by the use of a water-soluble alkali soap of polymerized rosin as the emulsifying agent. I have found that emulsions containing polymerized rosin in the form of a water-soluble soap thereof employed as the emulsifying agent, offer advantages not attainable with previous emulsions. In accordance with the present invention, therefore, a water-soluble alkali soap such as an alkali metal soap of polymerized rosin is incorporated into the emulsion.

The present invention is applicable to emulsions of the oil-in-water type wherein the dispersed or discontinuous phase comprises a water-insoluble organic material preferably having binding properties such as bituminous or asphaltic material, waxes, natural or synthetic resins, etc. and wherein the continuous phase is an aqueous medium such as water.

The dispersed phase of the emulsion preferably comprises a substantial amount of a bituminous material such as any of the bituminous materials which are customarily employed in the preparation of bituminous emulsions used for road-paving, soil stabilization, etc., for example various asphalts such as California, Mid.-Continent, Gulf, Venezuelean, Trinidad, or other bituminous materials, mixtures of the foregoing bituminous materials, etc. While the invention is particularly applicable to the production of bituminous emulsions, it is not limited thereto but may be used for the preparation of emulsions of other water-insoluble organic materials, plastics, or liquids, such as waxes, natural resins, synthetic resins, hydrocarbon oils as for example, mineral oil and similar petroleum oils, and similar viscous to highly viscous water-insoluble organic materials, mixtures of the foregoing materials with one another, solutions of the foregoing materials in volatile organic solvents, etc. If desired, the melting point and viscosity of the material emulsified may be materially reduced by fluxing the material with a fluxing agent such as mineral oil or the like. The invention is also applicable to the preparation of emulsions containing in the dispersed phase free polymerized rosin either alone or in conjunction with other materials of the foregoing type such as for example, asphalt, wax, other resins, mineral oil or similar fluxes, etc. Emulsions of polymerized rosin are widely applicable throughout the arts and may be used for example in the treatment of textiles, etc.

Examples of resins which may be dispersed, or solutions of which in volatile organic solvents or non-volatile solvents such as mineral oil or other oil such as linseed oil or the like may be emulsified, in accordance with the present invention are: natural resins such as copals, rosin, shellac, sandarac, etc., modified rosin such as hydrogenated rosin, ester gum, polymerized rosin, isomerized rosin, rosin subjected to treatment with a hydrogenating catalyst but in the absence of hydrogen and known as "Hyex" rosin, etc., synthetic resins such as alkyds, phenol-aldehyde, cumarone resin, modified alkyds and phenolics, etc.

As the emulsifying agent or as an important constituent of the emulsifying agent, there is employed a water-soluble soap of polymerized rosin such as the alkali soaps formed with sodium, potassium, ammonium, or lithium hydroxides or equivalent soaps, such as the triethanolamine soaps of polymerized rosin and soaps formed with organic substituted ammonia or ammonium hydroxides, such as quaternary ammonium hydroxides.

It has been found that improved emulsions may be prepared wherein the emulsifying agent comprises an alkali salt of polymerized rosin. Emulsions of higher viscosity with the same solids content or of lower solids content with the same viscosity may be prepared in this way and are found to be superior for many purposes. A disadvantage of prior emulsions such as those made with aqueous fatty acid or rosin soap solutions has been relatively low viscosity and instability. In order to increase the viscosity of such emulsions for certain uses, it has been customary to add either a salt such as calcium or sodium chloride which greatly reduces the stability and utility of the emulsion, or an organic material such as gelatine, glue, or casein which deteriorates and spoils with the passage of time so that the emulsion becomes unusable. By means of the present invention, slow-break high viscosity permanent emulsions may be prepared giving better and more uniform contact with soil or aggregate admixed therewith and capable of being more highly diluted with water so that less solids may be employed.

The proportions of the various constituents of the emulsion may be varied widely depending upon the components of the emulsion and the use to which it is to be put. The proportions and method of preparation are such that an oil-in-water type emulsion results. I have found that excellent results may be obtained when using from about 5% to about 70% by weight of the dispersed phase based on the weight of the emulsion, from about 0.1% to about 20% by weight of emulsifying agent comprising water-soluble soap of polymerized rosin, the balance being water which may, for example, vary from about 30% to about 95% by weight. An excellent concentrated asphalt emulsion may embody by weight from about 50% up to about 70% of asphalt or other bituminous material, up to about 10% of mineral oil, from about 0.1% to about 20% of a water-soluble soap of polymerized rosin and from about 10% to about 50% of water. If desired, free alkali, such as an alkali metal hydroxide, may be present in amount ranging from a trace up to about 1% by weight. This emulsion may be considerably diluted with water without breaking. The alkali soap of polymerized rosin is used in substantial proportions with respect to any other emulsifying agents present.

The emulsifying agent or the aqueous medium of the emulsion may in many cases advantageously comprise in addition to the alkali soap of polymerized rosin various other emulsifying or stabilizing agents such as ordinary water-soluble soaps of higher fatty acids of 12 or more carbon atoms, sulfonated lauryl alcohol and salts thereof, soaps of rosin such as sodium rosinate, etc. While it is generally preferred to use an emulsifying agent comprising a substantial proportion of polymerized rosin soap, and still more highly preferred to have the polymerized rosin soap constitute the major or exclusive constituent in the emulsifying agent, the use of such other emulsifying agents frequently is advantageous because of special properties imparted to the emulsion thereby in addition to those imparted by the polymerized rosin soap.

If desired, the resulting emulsion may contain a small amount of free alkali which further adds to the stability of the emulsion and which may be present in amounts varying up to say about 1% by weight of the emulsion. This free alkali may be the same as that present in combined form in the polymerized rosin soap or different therefrom. Examples of suitable free alkali are sodium, potassium, ammonium, or lithium hydroxides, tri-ethanolamine, other organic substituted ammonia compounds, organic substituted ammonium hydroxides such as the quaternary ammonium hydroxides, etc.

The use of additional emulsifying agent such as fatty acid soap may be eliminated if desired, relying exclusively upon the polymerized rosin soap to maintain the emulsion. Alternatively, a mixture of polymerized rosin soap and free alkali or its equivalent, or a mixture comprising polymerized rosin soap, additional emulsifying agent such as fatty acid soap, and free alkali may constitute the emulsifying agent.

The emulsion may be prepared in any desired manner, for example, by heating the component or components to be dispersed to an elevated temperature to attain fluidity or lessen the viscosity, and then agitating with a heated aqueous solution of the preformed polymerized rosin soap followed by passage through a colloid mill, if desired. If desired, the soap may be formed in situ during the emulsification process, for example by heating polymerized rosin or a mixture of polymerized rosin and substantially unsaponifiable material such as asphalt and admixing with a heated aqueous solution of alkali in the proper proportion. The amount of alkali employed may be less than, equal to, or greater than that required to neutralize the polymerized rosin. In addition to polymerized rosin, suitable amounts of other saponifiable material such as stearic acid, oleic acid, ordinary rosin, etc. may be employed in this manner. For example, a mixture of polymerized rosin and a fatty acid either with or without asphalt or other unsaponifiable material may be commingled with a warm solution of alkali, followed by passage through a colloid mill. The amount of alkali preferably is equal to, or greater than that required to neutralize the saponifiable material present in order to insure formation of the maximum quantity of polymerized rosin soap.

Frequently, where a bituminous emulsion is being prepared, it will be desirable to modify the resulting emulsion by the use of a flux such as mineral oil, which may be blended in advance with the asphalt or which may be emulsified in the aqueous medium prior to emulsification of the melted asphalt or mixture of asphalt and polymerized rosin. The percentage of oil so employed may vary from about 0.5% to about 15% by weight based on the weight of the asphalt.

Where free alkali is used to effect the formation of an emulsifying soap in situ, the amount of free alkali may vary from that insufficient to completely saponify all the saponifiable material thereby leaving the unsaponified and unsaponifiable material in the dispersed phase up to a point where a considerable excess of free alkali is left in the aqueous phase.

In this specification and the claims appended hereto, the term polymerized rosin is intended to designate rosin, preferably wood rosin, the melting point of which has been substantially increased by suitable treatment so as to effect polymerization accompanied by or as a result of the combination of rosin molecules with one another at the double bonds. Methods for the preparation of polymerized rosin are well known in the art and therefore a detailed description thereof is unnecessary. In general, polymerized rosin may be said to be characterized by a melting point increase above ordinary rosin of from about 5° C. to about 100° C. Polymerized rosin is characterized by properties of the general nature of those of rosin but with a difference that it has a molecular weight of from 5% to about 400% greater than ordinary rosin in its pure state, that it has a materially increased melting point as indicated above, that it is substantially free from hardening substances held in combination, that it has an iodine value materially lower than that of ordinary rosin and that its acid number may vary from about that of the original rosin to considerably therebelow, say down to an acid number of about 100. Polymerized rosin may contain from about 10% up to 100% by weight of the dimer of the resin acids.

There are given below a number of specific examples which, however, are not to be taken as limiting. In these examples, the polymerized rosin used had the following characteristics:

Acid number_____ 151–155
Color_____ 14–26 amber
Grade_____ X to WG
Melting point (drop)_____ 98–101° C.
Color with 2% lead resinate_____ 25–40 amber While a particular grade of polymerized rosin was used in the examples, it will be understood that the invention is by no means limited thereto, but on the contrary is applicable generally with polymerized rosins which may have melting points varying from about 5° C. above the melting point of the original rosin up to about 170° C., the melting point of the dimer. It is preferred, however, to use a polymerized rosin having a melting point of at least about 95° C. The water used was distilled water, although any fairly pure water may be substituted.

Example 1

Parts by weight
Asphalt (California, 32° C. drop M. P.)_____ 296
Mineral oil (S. A. E. 30)_____ 20
Polymerized rosin_____ 17
Flake sodium hydroxide_____ 3
Water_____ 78

The caustic was dissolved in the water and the solution heated to boiling. The boiling solution was added cautiously with vigorous agitation to the melted mixture (95–115° C.) of asphalt, polymerized rosin, and mineral oil. A stable emulsion resulted. The emulsion contained by weight: asphalt 71.4%, mineral oil 4.8%, polymerized rosin sodium soap 4.5%, free sodium hydroxide 0.3%, and water 18.8%.

Example 2

The same formulation and procedure as in Example 1 were followed except that 4.2 parts by weight of flake potassium hydroxide were substituted for the sodium hydroxide. The resulting stable emulsion contained by weight: asphalt 71.3%, mineral oil 4.8%, polymerized rosin potassium soap 4.7%, free potassium hydroxide 0.4%, and water 18.8%.

Example 3

Parts by weight
Asphalt (California 180–200 penetration)___ 600
Flake sodium hydroxide_____ 5
Polymerized rosin_____ 10
Water_____ 400

The polymerized rosin and asphalt were melted together at 100–115° C. to give a uniform mixture. Meanwhile, the sodium hydroxide was dissolved in the water and the solution heated to 50–60° C. These were then mixed by passing into a colloid mill. The emulsion contained by weight: asphalt 59.1%, polymerized rosin sodium soap 1.1%, free NaOH 0.4%, and water 39.4%.

Example 4

The same formulation and method as in Example 3 were followed except that 7 parts of potassium hydroxide were substituted for the sodium hydroxide. The resulting stable emulsion contained by weight: asphalt 59.0%, polymerized rosin potassium soap 1.1%, free potassium hydroxide 0.5%, and water 39.3%.

Example 5

Parts by weight
Polymerized rosin_____ 150
Aqueous sodium hydroxide (17%)_____ 35.4
Water_____ 100

The polymerized rosin was melted and while the temperature was held at 100–105° C., the sodium hydroxide solution was added with vigorous stirring. Thereupon, the water was added slowly. A light cream colored paste resulted.

Example 6

Percent by weight
Polymerized rosin_____ 65.3
Polymerized rosin sodium soap_____ 2.1
Granular household soap_____ 1.8
Water_____ 31.8

The correct amount of sodium hydroxide was dissolved in the water, whereupon the granular household soap was dissolved in the solution and the resulting solution added to the molten polymerized rosin. Another method of preparation involved using a preformed soap of the polymerized rosin, dissolving it in the water, adding the household soap and adding this solution to the molten polymerized rosin. If desired, the fatty acid soap may be formed in situ by dissolving a fatty acid such as oleic acid in the molten polymerized rosin, whereupon the aqueous solution of the correct amount of sodium hydroxide is added.

Example 7

Percent by weight
Asphalt (California 180–200 penetration)___ 58.4
Polymerized rosin sodium soap_____ 2.9
Water_____ 38.7

The molten asphalt was run into a solution of the soap in the water at an elevated temperature. The mixture was passed through a colloid mill to yield the stable emulsion.

Example 8

Percent by weight
Coal tar (coke oven, melting point 25° C., specific gravity 1.19, 68% soluble in 88° petroleum naphtha)_____ 68.2
Polymerized rosin sodium soap_____ 2.3
Fatty acid sodium soap_____ 1.9
Water_____ 27.0

The soaps were dissolved in the water at 80° C. The molten coal tar at 80° C. and the aqueous solution of soaps were simultaneously passed through a colloid mill in the proper proportions to yield a stable emulsion.

Example 9

Percent by weight
Asphalt (California 180–200 penetration)___ 58.0
Polymerized rosin sodium soap_____ 1.8
Granular household soap_____ 1.1
Free sodium hydroxide_____ 0.6
Water_____ 38.5

The correct amount of polymerized rosin was melted together with the asphalt and the mixture run into an aqueous solution of the fatty acid soap and the correct amount of sodium hydroxide. Upon passage through a colloid mill a stable emulsion was obtained.

Example 10

| | Percent by weight |
|---|---|
| Polymerized rosin | 20.0 |
| Asphalt (California 180–200 penetration) | 32.8 |
| Polymerized rosin sodium soap | 10.0 |
| Water | 36.2 |
| Free sodium hydroxide | 1.0 |

The correct amount of polymerized rosin was admixed and melted with the asphalt and the molten mixture run into a warm solution of the correct amount of sodium hydroxide in water. Upon passing the mixture through a colloid mill a stable emulsion was obtained.

Example 11

| | Percent by weight |
|---|---|
| Polymerized rosin | 32.3 |
| Asphalt (California 180–200 penetration) | 21.6 |
| Polymerized rosin sodium soap | 1.7 |
| Sodium oleate | 2.1 |
| Water | 42.3 |

The correct amounts of polymerized rosin and of oleic acid were fluxed with the asphalt and this mixture commingled with the correct amount of sodium hydroxide dissolved in the water. Upon passing the mixture through a colloid mill, a stable emulsion was obtained.

Example 12

| | Percent by weight |
|---|---|
| I wood rosin | 16.8 |
| Paraffin wax | 10.5 |
| Polymerized rosin sodium soap | 3.8 |
| Water | 58.9 |

The rosin and the wax were fluxed together and added with vigorous agitation to a solution of the polymerized rosin soap in water at an elevated temperature. The mixture was passed through a colloid mill to yield a stable emulsion.

Example 13

| | Parts by weight |
|---|---|
| Pine oil | 18 |
| Mineral oil | 2 |
| Diglycol stearate | 8 |
| Polymerized rosin | 12 |
| Ammonia (28% aqueous) | 8 |
| Water | 200 |

The polymerized rosin was melted and the ammonia cautiously added with stirring. The pine oil, diglycol stearate, and mineral oil were then added with vigorous agitation. Thereupon, the water was slowly added while the whole was vigorously agitated. A stable emulsion was formed. This emulsion had the following analysis by weight:

| | Per cent |
|---|---|
| Pine oil | 7.2 |
| Mineral oil | 0.8 |
| Diglycol stearate | 3.2 |
| Ammonia soap of polymerized rosin | 5.3 |
| Ammonia (NH$_4$OH) | 0.4 |
| Water (including that from the ammonia) | 82.7 |

From the foregoing, it will be seen that the present invention provides a method of making improved emulsions adapted to a variety of uses such as in the paving art, in plastic and liquid coating compositions, as polishing compositions, and generally where aqueous emulsions of water-insoluble organic materials are used.

In this specification and in the claims appended hereto, the term "emulsion" is to be understood as meaning either a true emulsion of a liquid or semi-liquid organic material or a suspension or dispersion of a semi-solid or solid organic material. Likewise, the term "water-soluble soap" is intended to denote the alkali soaps whether truly water-soluble or merely water-dispersible.

It will be understood that the details and examples hereinbefore set forth are illustrative only and that the invention as broadly described and claimed is in no way limited thereby.

What I claim and desire to protect by Letters Patent is:

1. An oil-in-water type emulsion comprising a dispersed phase of emulsifiable organic water-insoluble material, an aqueous continuous phase, from about 0.1% to about 20% by weight of a water-soluble alkali soap of polymerized rosin, and free soluble strong alkali.

2. An oil-in-water type emulsion comprising free polymerized rosin in the dispersed phase, an aqueous continuous phase, and from about 0.1% to about 20% by weight of an emulsifying agent comprising an alkali soap of polymerized rosin.

3. A bituminous oil-in-water type emulsion comprising an aqueous continuous phase, a dispersed phase of substantially unsaponifiable material comprising a bituminous material, from about 0.1% to about 20% by weight of an emulsifying agent comprising a water-soluble soap of polymerized rosin, and free soluble strong alkali.

4. A bituminous emulsion of the oil-in-water type comprising from about 50% to about 70% by weight of bituminous material, from about 0.1% to about 20% by weight of a water-soluble soap of polymerized rosin, and from about 10% to about 50% by weight of water.

5. The process of making an emulsion of the water-in-oil type which comprises heating and agitating a water-insoluble material comprising polymerized rosin with an aqueous solution of free alkali, the proportions and components being such that a portion of said material in unsaponified form enters into the dispersed phase and from about 0.1% to about 20% by weight of the emulsion is present as a water-soluble soap of polymerized rosin.

6. An oil-in-water type emulsion comprising a dispersed phase of an emulsifiable organic water-insoluble material, an aqueous continuous phase, and from about 0.1% to about 20% by weight of an emulsifying agent comprising a water-soluble alkali soap of polymerized rosin.

7. A bituminous oil-in-water type emulsion comprising an aqueous continuous phase, a dispersed phase of substantially unsaponifiable material comprising a bituminous material, and from about 0.1% to about 20% by weight of an emulsifying agent comprising a water-soluble soap of polymerized rosin.

8. An emulsion of the oil-in-water type comprising mineral oil in the dispersed phase, an aqueous continuous phase, and from about 0.1% to about 20% by weight of an emulsifying agent comprising a water-soluble soap of polymerized rosin.

9. An oil-in-water type emulsion comprising from about 5% to about 70% by weight of an emulsifiable organic water-insoluble material, from about 0.1% to about 20% by weight of a water-soluble soap of polymerized rosin, and from about 30% to about 95% by weight of water.

10. An emulsion of the oil-in-water type comprising from about 5% to about 70% by weight of a bituminous material, from about 0.1% to about 20% by weight of a water-soluble soap of polymerized rosin, and from about 30% to about 95% by weight of water.

11. An emulsion of the oil-in-water type comprising from about 5% to about 70% by weight of uncombined polymerized rosin, from about 0.1% to about 20% by weight of a water-soluble soap of polymerized rosin, and from about 30% to about 95% by weight of water.

12. An emulsion of the oil-in-water type comprising from about 5% to about 70% by weight of mineral oil, from about 0.1% to about 20% by weight of a water-soluble soap of polymerized rosin, and from about 30% to about 95% by weight of water.

13. An oil-in-water type emulsion comprising a dispersed phase of an emulsifiable organic water-insoluble material, an aqueous continuous phase, a water-soluble soap of a higher fatty acid, and from about 0.1% to about 20% by weight of an emulsifying agent comprising a water-soluble alkali soap of polymerized rosin.

JOSEPH N. BORGLIN.